United States Patent Office 3,583,015
Patented June 8, 1971

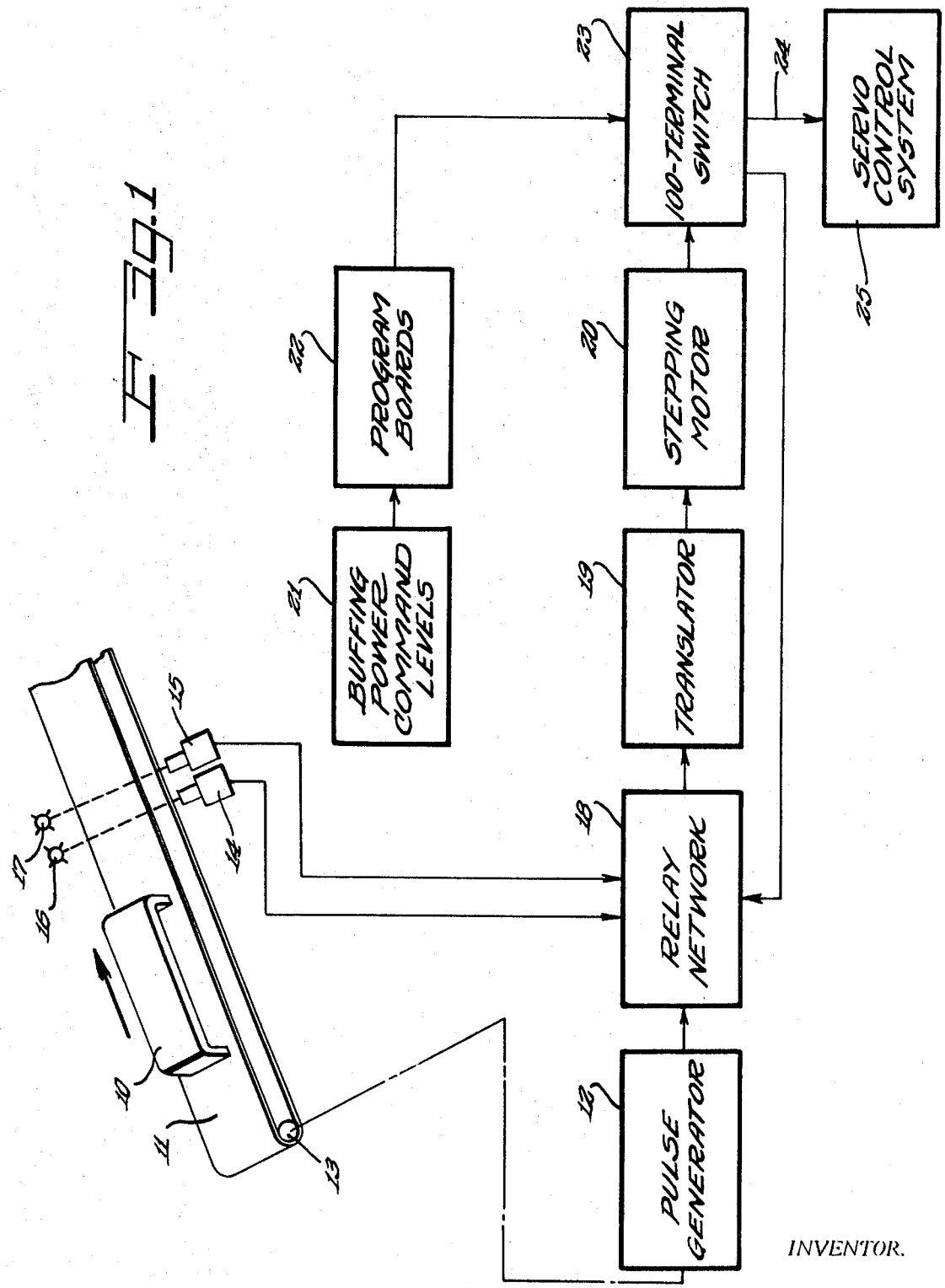

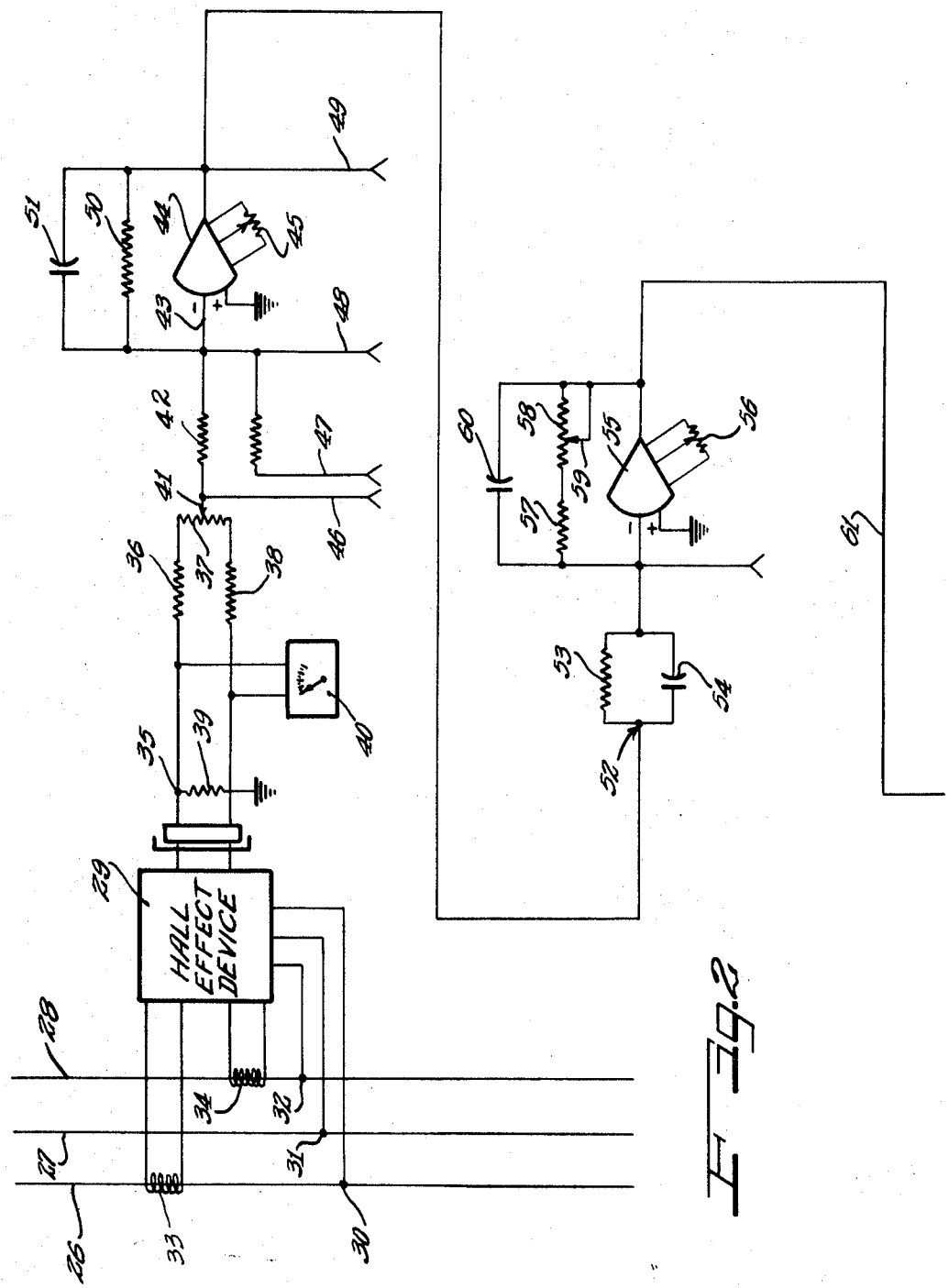

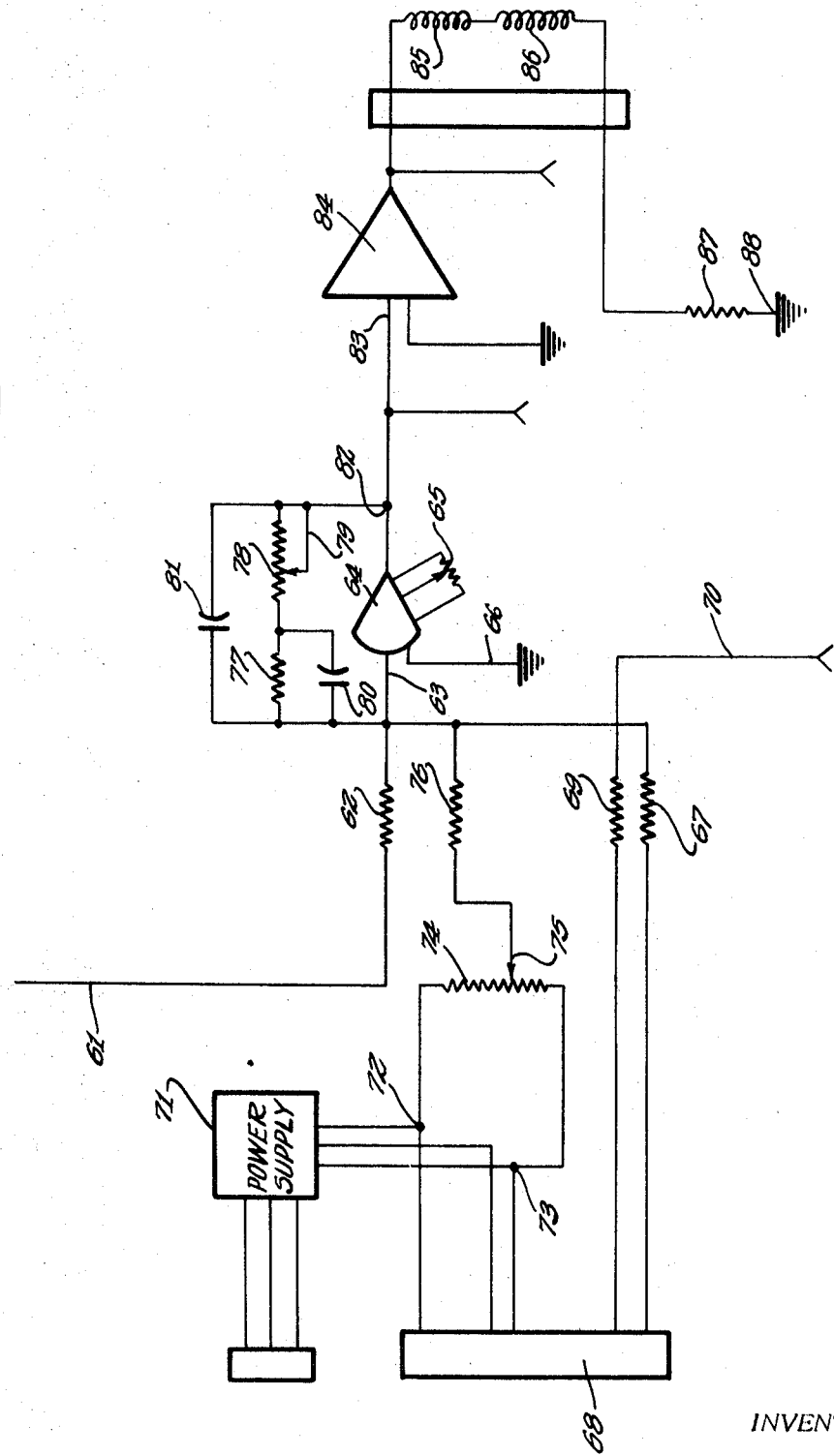

3,583,015
CONTROL CIRCUIT FOR AUTOMATIC BUFFING EQUIPMENT
Glenn J. Eggert, Columbus, Ohio, and Mervyn E. Nicholls, Oshawa, Ontario, Canada, assignors to Houdaille Industries, Inc., Buffalo, N.Y.
Continuation of application Ser. No. 714,632, Mar. 20, 1968. This application July 7, 1969, Ser. No. 845,636
Int. Cl. B24b 29/00
U.S. Cl. 15—97        10 Claims

ABSTRACT OF THE DISCLOSURE

An automatic buffing control system including means for sensing power delivered to a buffing motor and for generating a first signal in response thereto. The first signal is differentiated and the time differential is combined with the first signal to generate an output signal. The output signal is amplified and combined with a control signal indicative of the desired power level being applied to the buffing motor and the resulting error signal is applied to a servo driver for increasing or decreasing the contact pressure of a buffing wheel with a product being buffed thereby increasing or decreasing the power applied to the buffing head. By so sensing the buffing power, the buffing head is caused to follow the contour of the object being buffed. In such a system, therefore, the performance of the system is independent of the wear of the buffing wheel.

---

The present application is a strealined continuation of our application, Ser. No. 714,632, filed Mar. 20, 1968, and now abandoned.

BACKGROUND OF THE INVENTION

Field of the invention

The field of art to which this invention pertains is an automatic control system, and, in particular, to a servo system for controlling the power applied to a buffing head by directly sensing three phase power delivered to the buffing motor drive.

SUMMARY

It is an important feature of the present invention to provide an improved control system for automatically regulating the power applied to a buffing head in accordance with a predetermined desired power.

It is also a feature of the present invention to provide an improved buffing control system which is more responsive to an input control signal for maintaining a desired instantaneous power at the buffing head.

It is an important object of the present invention to provide an automatic buffing control circuit which senses buffing head power by detecting input power to the buffing drive motor.

It is another object of the present invention to provide an automatic buffing control circuit which instantaneously monitors buffing head power and which responds rapidly to a tendency to decrease power by increasing the buffing head contact with the product being buffed.

It is a further object of the present invention to provide an automatic buffing control circuit which senses buffing head power by measuring motor input power and which utilizes the combination of a first signal and a time differential of the first signal to monitor both the motor power and the rate of change of the motor power and to control the buffing contact with a product being buffed in response to the combination of said signals.

It is still another object of the present invention to provide an automatic buffing control circuit which utilizes a power transducer for generating a signal in response to the input power applied to the buffing motor and for utilizing the response signal in combination with a desired input control signal for driving a servo device to regulate the contact pressure of the buffing head with the product being buffed.

These and other objects, features an advantages of the present invention will be understood in greater detail from the following description and the associated drawings wherein reference numerals are utilized to designate an illustrative embodiment.

BRIEF DESCRIPTION OF THE DRAWINGS

FIG. 1 is a block diagram of an illustrative type buffing control system which may employ the automatic control circuit in accordance with the present invention;

FIG. 2 is a portion of a schematic illustrating the buffing control system of the present invention, and FIG. 3 is the remaining portion of a schematic illustrating the automatic control system of the present invention.

DESCRIPTION OF THE PREFERRED EMBODIMENT

The aromatic buffing control circuit of the present invention may be utilized in conjunction with a buffing system for buffing automobile bumpers or the like. Such a system is shown in block form in FIG. 1 and is intended only to be an illustrative system in which the automatic servo control system of the present invention as described in FIGS. 2 and 3 may be employed.

In FIG. 1, an automobile bumper 10 may be deployed on a moving conveyor 11 which moves the bumper 10 past a buffing wheel (not shown) which may be disposed directly above the conveyor for contacting the moving bumper.

A pulse generator 12 may be keyed as at 13, for instance, to the movement of the conveyor 11 to generate a series of pulses which are indicative of the progressive movement of the bumper in the direction of the buffing wheel. A series of photocells 14 and 15 which are energized by light sources 16 and 17 may be utilized to initiate the actuation of the control system as the bumper 10 crosses the light beam from the light sources 16 and 17.

A signal received from the photocells 14 and 15 in conjunction with a signal received from the pulse generator 12 triggers a relay network 18 which in turn generates a signal through a translator 19 to control the energization of a stepping motor 20.

Accordingly, movement of the stepping motor 20 is keyed to the forward movement of the conveyor 11 and hence of the automobile bumper 10.

The general purpose of the system shown in FIG. 1 is to provide a series of command power levels for the buffing head to automatically buff irregular contours on a moving bumper. It is apparent that the buffing head will have to be raised and lowered rapidly against the surface of the moving bumper to uniformly buff the surface thereof without missing certain portions and without over-buffing other portions which could result in destruction of the bumper finish.

In the system of FIG. 1, a number of buffing power command levels are provided as illustrated at 21. These command voltage levels are coupled to a program board or boards 22 which apply the command levels to a series of distinct terminals. For instance, the series of buffing power command levels may be applied through a program board to a one hundred terminal switch or the like as illustrated at 23. The stepping motor 20 causes the switch 23 to move through its sequence and apply each of the power command levels to the buffing servo system at one hundred distinct points along the length of the moving bumper 10. In this way, the bumper 10 may be said to be divided into one hundred distinct linear segments each of which is related to a given terminal on the one hundred terminal switch 23, and each of which as it passes beneath the buffing head causes the application of a prechosen power command level to an output terminal as indicated at 24 and hence to the servo control system 25 of the present invention.

In FIG. 2, three phase power may be applied to the buffing motor of the present invention through a series of lines 26, 27 and 28. A power transducer 29 is coupled to each of the lines 26, 27 and 28 at terminals 30, 31 and 32, respectively. In addition, the current through two of the three phases such as the phases 26 and 28 is sensed through a pair of coils 33 and 34 in a well understood manner.

The transducer 29 then generates a first signal at a terminal 35. The signal at the terminal 35 is then applied across a voltage divider which consists of a number of resistors 36, 37 and 38. A resistor 39 is coupled in parallel with resistors 36, 37 and 38 to provide a given output load for the device 29. While the power transducer merely generates a signal which is proportional to three phase power, the actual power may be monitored by means of a standard power meter 40 which calibrates the signal appearing at the terminal 35 in terms of power input to the buffing motor.

A movable contact 41 which together with the resistor 37 comprises a potentiometer, couples the first signal through a resistor 42 to the input 43 of an amplifier 44. The amplifier 44 is provided with a balance potentiometer 45 and a series of pin jacks 46, 47, 48 and 49 may be provided for testing purposes or the like.

A filter which includes a resistor 50 and a parallel connected capacitor 51 is coupled across the amplifier 44 for filtering out high frequency signal components which may have originated in the sensor of the buffing motor power input.

The output of the amplifier 44 is then coupled to an RC network 52 which includes a resistor 53 and a capacitor 54. The output of the amplifier 44 is differentiated through the capacitor 54 and combined with the first signal at the input of an amplifier 55. The amplifier 55, like the amplifier 44, has a balance potentiometer 56 and a filter network which includes a pair of resistors 57 and 58 which has a movable contact 59 and a parallel connected capacitor 60 for removing high frequency components which may be present at the input of the amplifier 55.

The output of the amplifier 55 is coupled through a line 61 as shown in both FIG. 2 and FIG. 3 through a resistor 62 (FIG. 3) to the input 63 of a further amplifier 64. As in the case of the amplifiers 44 and 55, the amplifier 64 has a balance potentiometer 65 and is provided with a ground as at 66.

As was indicated in conjunction with FIG. 1, means must be provided for supplying a desired input signal to the servo control system in order to determine the instantaneous power which must be applied to the buffing head in order to perform a prescribed buffing operation in keeping with the continuous forward movement of the bumper and in accord with the irregular contour of the surface being buffed. As has already been described, means are provided in FIG. 2 to sense the input power to the buffing motor. It has been discovered that input power to the motor is most linearly related to buffing head power, and accordingly, the power transducer 29 has been employed to generate a signal which at the circuit point 61 includes a first signal and a time differential signal both indicative respectively of the input power to the motor and the rate of change of power being applied to the buffing motor. However, to continuously control the power applied to the buffing motor, means must be provided to compare the signal which may be said to be a monitor signal as developed at the circuit point 61 with a desired signal which is indicative of the desired power at the buffing head at any given instant of time or at any given increment of advancement of the bumper 10 in its course beneath the buffing head.

Accordingly, the block system shown in FIG. 1 provides a number of discrete voltages at a point 24 in FIG. 1 which are indicative of the desired power level or power which is desired to be applied to the buffing head at a given increment of positioning of the bumper 10 on the conveyor course. These voltage levels as indicated at 24 are applied through a resistor 67 to the circuit junction point 63 which is also the input to the amplifier 64. The resistor 67 is coupled to a circuit junction board 68 from which a further resistor 69 and a pin jack 70 may be coupled for testing purposes or the like. A power supply 71 is shown in FIG. 3 and is coupled to the board 68 through a pair of contacts 72 and 73 which in turn applies the power of the power supply 71 across a resistor 74. A movable contact 75 couples the power of the power supply through a further resistor 76 to supply the amplifier 64 as shown.

The amplifier 64 is also provided with a filter network which includes a pair of resistors 77 and 78, the resistor being provided with a movable contact 79. Also, a capacitor 80 is provided in parallel with the resistor 77, and a second capacitor 81 is provided in parallel with the series combination of the resistors 77 and 78.

Accordingly, at the output of the amplifier 64, a signal is derived which is indicative of the difference between a desired or control signal as developed across the resistor 67 and an output or monitor signal as developed across the resistor 62. The signal at the output of the amplifier 64 then may be said to be a servo signal and may be used to control a servo mechanism for regulating the contact pressure of the buffing head at the bumper 10.

The output of the amplifier 64 as derived at circuit junction point 82 may be coupled to the input 83 of a power amplifier 84 or servo driver which in turn couples the servo signal to a pair of coils 85 and 86 which are grounded through a resistor 87 as at a circuit point 88. The coils 85 and 86 may be said to be servovalve coils. The servovalve in turn may be utilized to control pressurized hydraulic fluid delivered to a cylinder or other suitable hydraulic actuating device for the purpose of positioning a buffing head for increasing or decreasing the pressure of the buffing head against the moving variable contoured buffing surface of the bumper 10. The pressure of the buffing head against the bumper determines the buffing power which is measured by the watt transducer.

It will be apparent to those skilled in the art that the sensing of motor power is not the only way that the control system as described herein will function. The sensing of other parameters may be used. For instance, the normal force between the wheel and the work as measured with a force transducer at a bearing location could be used in conjunction with the above described control system to control the buffing head position for following contours.

It will be apparent from the above disclosure that various modifications and combinations of the features of this invention may be accomplished by those skilled in the art, but we desire to claim all such modifications and combinations as properly come within the spirit and scope of our invention.

We claim as our invention:

1. In an automatic buffing system having a buffing head, motor means for driving the same and servo means for urging said buffing head into buffing contact with an irregularly contoured transversely moving product being buffed, an electronic control system comprising:
   means for substantially sensing the instantaneous power applied to said buffing head,
   means for developing an output signal in response to said sensing means,
   means for developing a control signal indicative of the instantaneous desired power for said buffing head,
   means for combining said control signal and said output signal,
   means for generating a servo signal in response to the combined control and output signals, and means for applying said servo signal to said servo means for substantially instantaneously moving said buffing head into greater or lesser force engagement with said product being buffed.

2. An electronic control system in accordance with claim 1 wherein said means for substantially sensing the instantaneous power applied to said buffing head comprises means for sensing the instantaneous electrical power delivered to said motor means.

3. An electronic control system in accordance with claim 2 wherein said means for sensing the instantaneous power delivered to said motor means comprises a Hall effect watt transducer for sensing three phase power delivered to said motor means.

4. An electronic control system in accordance with claim 2 wherein said means for developing an output signal comprises a first amplifier means having an input coupled to the output of said means for sensing the instantaneous power delivered to said motor means and including filter means for eliminating high frequency components at the output of said amplifier means.

5. An electronic control system in accordance with claim 4 wherein said means for developing a control signal indicative of the instantaneous desired power for said buffing head comprises a potentiometer and wherein said means for combining said control signal and said output signal includes a common circuit point and means for coupling the two signals to said common circuit point.

6. An electronic control system in accordance with claim 5 wherein said means for generating a servo signal comprises an amplifier means and means for coupling said common circuit point to the input of said amplifier means, said amplifier means generating said servo signal in response to the algebraic sum of said control and output signals as derived at said common circuit point.

7. In an automatic buffing system having a buffing head, motor means for driving the same and servo means for urging said buffing head into buffing contact with a product or irregular contour being buffed, an electronic control system comprising:
means for sensing the instantaneous power delivered to said motor means and for developing a first signal indicative of the sensed power,
first amplifier means for increasing the magnitude of said first signal,
means for developing a time differential of said first signal,
means for combining said first signal and said time differential signal to develop an output signal thereby,
means for monitoring said output signal, and
means for actuating said servo means in response to variations in the level of said output signal for substantially instantaneously moving said buffing head into greater or lesser force engagement with said product being buffed.

8. An electronic control system in accordance with claim 7 wherein said means for monitoring said output signal comprises:
means for developing a control signal indicative of the instantaneous desired power for said buffing head,
means for combining said control signal and said output signal, and
means for generating a servo signal in response to the combined control and output signals.

9. An electronic control system in accordance with claim 8 wherein said means for developing a control signal indicative of the instantaneous desired power for said buffing head comprises a potentiometer and wherein said means for combining said control signal and said output signal includes a second amplifier means and means for coupling the two signals to the input of said second amplifier means.

10. In an automatic buffing system having a buffing head, motor means for driving the same and servo means for urging said buffing head into buffing contact with an irregularly contoured product being buffed, an electronic control system comprising:
means for sensing the instantaneous power delivered to said motor means and for developing a first signal indicative of the sensed power,
first amplifier means for increasing the magnitude of said first signal,
means for developing a time differential of said first signal,
means for combining said first signal and said time differential signal to develop an output signal thereby,
means for developing a control signal indicative of the instantaneous desired power for said buffing head,
means for combining said control signal and said output signal,
means for generating a servo signal in response to the combined control and output signals,
said means for developing a control signal indicative of the instantaneous desired power for said buffing head including a potentiometer,
said means for combining said control signal and said output signal including a common circuit point and means for coupling the two signals to said common circuit point,
said means for generating a servo signal including a second amplifier means and means for coupling said common circuit point to the input of said second amplifier means,
said second amplifier means generating said servo signal in response to the algebraic sum of said control and output signals as derived at said common circuit point, and
means for actuating said servo means in response to variations in the level of said output signal.

References Cited
UNITED STATES PATENTS

| | | |
|---|---|---|
| 3,026,461 | 3/1962 | Lee. |
| 3,125,714 | 3/1964 | Eisengrein. |
| 3,239,724 | 3/1966 | Uranishi. |
| 3,259,023 | 7/1966 | Rieger et al. |
| 3,305,765 | 2/1967 | Rittner. |
| 3,332,863 | 7/1967 | Woods. |
| 3,339,521 | 9/1967 | Spencer. |
| 3,394,501 | 7/1968 | Carlson et al. |

WALTER A. SCHEEL, Primary Examiner

L. G. MACHLIN, Assistant Examiner

U.S. Cl. X.R.

318—432